United States Patent
Morris et al.

(10) Patent No.: US 10,895,695 B2
(45) Date of Patent: Jan. 19, 2021

(54) ENCLOSURE FOR SPLICING OF OPTICAL FIBERS

(71) Applicant: CORNING RESEARCH & DEVELOPMENT CORPORATION, Corning, NY (US)

(72) Inventors: Richard David Morris, Fort Worth, TX (US); Karyne Poissant Prevratil, Fort Worth, TX (US); Diana Rodriguez, Fort Worth, TX (US); Harley Joseph Staber, Coppell, TX (US); Michael Gene Thornton, Jr., Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/844,202

(22) Filed: Apr. 9, 2020

(65) Prior Publication Data
US 2020/0233170 A1 Jul. 23, 2020

Related U.S. Application Data

(63) Continuation of application No. PCT/US2018/056251, filed on Oct. 17, 2018.
(Continued)

(51) Int. Cl.
*G02B 6/36* (2006.01)
*G02B 6/42* (2006.01)
(Continued)

(52) U.S. Cl.
CPC ......... *G02B 6/3628* (2013.01); *G02B 6/3825* (2013.01); *G02B 6/4284* (2013.01); *G02B 6/4452* (2013.01); *G02B 6/4455* (2013.01)

(58) Field of Classification Search
CPC .............. G02B 6/36; G02B 6/38; G02B 6/42
(Continued)

(56) References Cited

U.S. PATENT DOCUMENTS 4,792,203 A * 12/1988 Nelson .................... G02B 6/24
385/134
4,898,448 A * 2/1990 Cooper ................ G02B 6/4452
385/135
(Continued)

FOREIGN PATENT DOCUMENTS

| CA | 2245831 A1 | 8/1998 |
| DE | 4229510 A1 | 3/1994 |
| EP | 2221650 A1 | 8/2010 |

OTHER PUBLICATIONS

Leviton Network Solutions; "Fiber Systems, Network Infrastructure Platforms for Every Application"; 16 Pages; Downloaded Apr. 16, 2020.
(Continued)

*Primary Examiner* — Kaveh C Kianni
(74) *Attorney, Agent, or Firm* — Grant A. Gildehaus

(57) ABSTRACT

A splice enclosure for providing a space for receipt of a plurality of spliced optical fibers of a plurality of cables may include a cabinet including a rear wall, a first side wall coupled to the rear wall, and a second side wall coupled to the rear wall. The cabinet may also include a lower wall coupled to the first side wall, the second side wall, and/or the rear wall. The splice enclosure may further include a splice tray assembly, which may include a splice tray housing pivotally coupled to the cabinet, and a plurality of splice trays pivotally coupled to the splice tray housing and configured to provide a space for receipt of a plurality of spliced optical fibers of a plurality of cables. The splice tray housing may be pivotally coupled to the cabinet, such that the splice tray housing pivots.

16 Claims, 13 Drawing Sheets

Related U.S. Application Data

(60) Provisional application No. 62/573,381, filed on Oct. 17, 2017.

(51) Int. Cl.
*G02B 6/38* (2006.01)
*G02B 6/44* (2006.01)

(58) Field of Classification Search
USPC .......................................................... 385/39
See application file for complete search history.

(56) References Cited

U.S. PATENT DOCUMENTS

| | | | | |
|---|---|---|---|---|
| 4,911,514 A * | 3/1990 | Okada | ............... | G02B 6/2808 385/39 |
| 5,071,211 A * | 12/1991 | Debortoli | ............ | G02B 6/4452 174/50 |
| 5,100,221 A * | 3/1992 | Carney | ............... | G02B 6/4452 385/135 |
| 5,142,606 A * | 8/1992 | Carney | ............... | G02B 6/4452 385/134 |
| 5,181,044 A * | 1/1993 | Matsumoto | ......... | H01Q 1/3275 343/700 MS |
| 5,323,480 A * | 6/1994 | Mullaney | ............ | G02B 6/4442 385/135 |
| 5,402,515 A * | 3/1995 | Vidacovich | ......... | G02B 6/4452 385/135 |
| 5,613,030 A | 3/1997 | Hoffer et al. | | |
| 5,734,776 A * | 3/1998 | Puetz | ................... | G02B 6/4442 385/134 |
| 5,742,982 A * | 4/1998 | Dodd | ..................... | F16G 11/00 24/16 R |
| 5,862,290 A * | 1/1999 | Burek | ................... | G02B 6/3801 385/134 |
| 5,946,440 A * | 8/1999 | Puetz | ................... | G02B 6/4455 385/135 |
| 6,112,006 A * | 8/2000 | Foss | ..................... | G02B 6/4442 385/135 |
| 6,533,472 B1 * | 3/2003 | Dinh | ................... | G02B 6/4447 385/135 |
| 7,031,588 B2 | 4/2006 | Cowley et al. | | |
| 7,045,710 B1 * | 5/2006 | Allen | ................... | G02B 6/4442 174/38 |
| 8,213,761 B2 * | 7/2012 | Gronvall | ............ | G02B 6/4471 385/135 |
| 8,953,924 B2 * | 2/2015 | Cote | ................... | G02B 6/4471 385/137 |
| 9,140,870 B2 * | 9/2015 | Marmon | ............ | G02B 6/4454 |
| 9,791,653 B2 * | 10/2017 | Aznag | ................... | G02B 6/4444 |
| 9,851,524 B2 * | 12/2017 | Vongseng | ........... | G02B 6/4455 |
| 2002/0150372 A1 | 10/2002 | Schray | | |
| 2005/0271344 A1 * | 12/2005 | Grubish | ............... | G02B 6/445 385/135 |
| 2006/0032659 A1 * | 2/2006 | Allen | ................... | H02G 3/105 174/92 |
| 2006/0034578 A1 * | 2/2006 | Allen | ................... | H01L 29/49 385/135 |
| 2006/0215980 A1 * | 9/2006 | Bayazit | ............... | G02B 6/4454 385/135 |
| 2007/0047895 A1 * | 3/2007 | Parikh | ............... | H02G 15/013 385/135 |
| 2007/0183732 A1 * | 8/2007 | Wittmeier | ........... | G02B 6/4442 385/135 |
| 2007/0206780 A1 * | 9/2007 | Kerry | ................... | G02B 6/4466 379/413.02 |
| 2008/0298764 A1 * | 12/2008 | Bloodworth | ......... | G02B 6/4452 385/135 |
| 2009/0110359 A1 * | 4/2009 | Smith | ................... | G02B 6/4452 385/135 |
| 2009/0238531 A1 * | 9/2009 | Holmberg | ........... | G02B 6/4454 385/135 |
| 2009/0252472 A1 * | 10/2009 | Solheid | ............... | G02B 6/4447 385/135 |
| 2009/0257726 A1 * | 10/2009 | Redmann | ............... | H04Q 1/021 385/135 |
| 2010/0092147 A1 * | 4/2010 | Desard | ................ | G02B 6/4477 385/135 |
| 2010/0172621 A1 | 7/2010 | Lee | | |
| 2010/0183274 A1 * | 7/2010 | Brunet | ................ | G02B 6/4455 385/135 |
| 2010/0290751 A1 * | 11/2010 | Naudin | ................ | G02B 6/4455 385/135 |
| 2010/0310221 A1 * | 12/2010 | Le Dissez | ........... | H04Q 11/0005 385/135 |
| 2011/0026894 A1 * | 2/2011 | Rudenick | ............... | G02B 6/445 385/135 |
| 2011/0164854 A1 * | 7/2011 | Desard | ................ | G02B 6/4455 385/135 |
| 2012/0230646 A1 * | 9/2012 | Thompson | ........... | G02B 6/3887 385/135 |
| 2013/0101262 A1 | 4/2013 | Wei et al. | | |
| 2013/0214662 A1 * | 8/2013 | Pimentel | .............. | G02B 6/4454 312/330.1 |
| 2013/0322839 A1 * | 12/2013 | Claessens | ........... | G02B 6/4455 385/135 |
| 2014/0079366 A1 * | 3/2014 | Rodriguez | ............... | G02B 6/36 385/136 |
| 2014/0314388 A1 * | 10/2014 | Alaerts | ................ | G02B 6/4471 385/135 |
| 2015/0117829 A1 * | 4/2015 | Allen | ..................... | G02B 6/4452 385/135 |
| 2015/0253528 A1 * | 9/2015 | Corbille | ............... | G02B 6/4454 385/135 |
| 2015/0286022 A1 * | 10/2015 | Holmberg | ........... | G02B 6/4452 385/135 |
| 2016/0073181 A1 * | 3/2016 | Abbiati | .............. | H04Q 11/0067 398/45 |
| 2017/0045701 A1 * | 2/2017 | Diepstraten | .......... | G02B 6/4455 |
| 2017/0059060 A1 * | 3/2017 | Gallion | ................... | H02G 3/32 |
| 2019/0072736 A1 | 3/2019 | Glatzl et al. | | |
| 2019/0170961 A1 * | 6/2019 | Coenegracht | ........ | G02B 6/4444 |
| 2019/0187395 A1 * | 6/2019 | Solheid | ............... | G02B 6/4452 |

OTHER PUBLICATIONS

International Search Report and Written Opinion of the International Searching Authroity; PCT/US2018/056251; dated Dec. 20, 2018; 9 Pages; ISA/US Commissioner for Patents.

Legrand Ortronics; "Optimo® High Density Fiber Optic Solutions"; 2 Pages; (2010).

\* cited by examiner

ENCLOSURE FOR SPLICING OF OPTICAL FIBERS

CLAIM OF PRIORITY

This application is a continuation of International Application No. PCT/US18/56251, filed on Oct. 17, 2018, which claims the benefit of priority to U.S. Application No. 62/573,381, filed on Oct. 17, 2017, both applications being incorporated herein by reference.

BACKGROUND

This disclosure relates to enclosures for splicing of optical fibers of optical cables, and more particularly, to enclosures for providing a space for receipt of a plurality of spliced optical fibers of a plurality of cables.

It is often desirable to splice the ends of one or more optical fibers of a first cable to the ends of one or more optical fibers of a second cable. For example, cables including optical fibers may be used to communicate information from a source to another one or more devices. Some such cables may be routed through the environment to a building and enter the building through one or more ducts. The interior of the building may include an internal communication network including one or more cables including optical fibers. The optical fibers from exterior to the building may be spliced to optical fibers in the interior of the building to link the communication from the source to the communication network in the interior of the building. A splice enclosure may be provided for providing a space for receipt of many spliced optical fibers of many cables. Splicing the optical fibers to one another is often tedious and time consuming, often resulting in significant expense. In addition, as data communication increases, and the number of optical fibers grows to accommodate the increase, the capacity of splice enclosures may be insufficient to accommodate the splicing of additional optical fibers in an efficient manner.

Some examples described herein may address one or more possible drawbacks associated with increasing the additional optical fibers.

SUMMARY

According to a first aspect, the present disclosure is generally directed to a splice enclosure for providing a space for receipt of a plurality of spliced optical fibers of a plurality of cables. The splice enclosure may include a cabinet defining an interior volume and may include a rear wall, a first side wall coupled to the rear wall, and a second side wall coupled to the rear wall and spaced from the first side wall. The cabinet may also include a lower wall coupled to at least one of the first side wall, the second side wall, or the rear wall. The cabinet may also include a front panel coupled to the first side wall. The cabinet may define a longitudinal axis extending in a direction parallel to planes in which the rear wall and at least one of the first wall or the second wall lie. The splice enclosure may further include a splice tray assembly, which may include a splice tray housing pivotally coupled to the cabinet, and a plurality of splice trays pivotally coupled to the splice tray housing and configured to provide a space for receipt of a plurality of spliced optical fibers of a plurality of cables. The splice tray housing may be pivotally coupled to the cabinet, such that the splice tray housing pivots about a housing pivot axis extending in a direction substantially perpendicular with respect to the longitudinal axis and substantially parallel with respect to the plane in which the rear wall lies.

According to a further aspect, this disclosure is also generally directed to a splice enclosure for providing a space for receipt of a plurality of spliced optical fibers of a plurality of cables. The splice enclosure may include a cabinet defining an interior volume and including a rear wall, a first side wall coupled to the rear wall, a second side wall coupled to the rear wall and spaced from the first side wall, and a lower wall coupled to at least one of the first side wall, the second side wall, or the rear wall. The cabinet may further include a front panel coupled to the first side wall. The splice enclosure may also include a splice tray housing coupled to the cabinet, and a plurality of splice trays coupled to the splice tray housing and configured to provide a space for receipt of a plurality of spliced optical fibers of a plurality of cables. The splice enclosure may also include a bracket coupled to the cabinet at an end of the cabinet remote from the lower wall, and the bracket may include an aperture configured to receive a boss associated with a clip configured to be coupled to at least one cable and the bracket.

According to another aspect, this disclosure is also generally directed to an assembly. The assembly may include a plurality of cables including a plurality of optical fibers, and a splice enclosure providing a space receiving a plurality of spliced optical fibers of the plurality of cables. The splice enclosure may include a cabinet defining an interior volume and including a rear wall, a first side wall coupled to the rear wall, a second side wall coupled to the rear wall and spaced from the first side wall, and a lower wall coupled to at least one of the first side wall, the second side wall, or the rear wall. The cabinet may also include a front panel coupled to the first side wall, and an upper wall removably coupled to at least one of the first side wall, the second side wall, or the rear wall. The upper wall may provide at least one entry point for the plurality of cables. The splice enclosure may also include a splice tray assembly including a splice tray housing coupled to the cabinet, and a plurality of splice trays coupled to the splice tray housing and configured to provide a space for receipt of a plurality of spliced optical fibers of a plurality of cables. The cabinet and the splice tray assembly may define a passage between the rear wall of the cabinet and the splice tray assembly. The plurality of optical fibers may pass through the upper wall, downward along the rear wall through the passage defined by the splice tray assembly and the rear wall, and loop back upward and into at least one of the splice trays.

DETAILED DESCRIPTION

Reference will now be made in detail to embodiments, examples of which are illustrated in the accompanying drawings. Whenever possible, the same reference numbers are used throughout the drawings to refer to the same or like parts.

This disclosure is generally directed to splice enclosures and related devices and methods for providing a space for receipt of a plurality of spliced optical fibers of a plurality of cables. For example, cables including optical fibers may be used to communicate information from a communication source to one or more devices. Such cables may be routed through the environment to a building or between buildings (e.g., data center buildings) via ducts and enter a building through one or more ducts. As noted above, the interior of the building may include an internal communication network including one or more cables including optical fibers. The optical fibers from exterior to the building may be spliced to optical fibers in the interior of the building to link the communication from a communication source to the communication network in the interior of the building. In some examples, the cables exterior to the building may have different requirements than requirements of the cables inside the building. For example, cables inside a building may need to comply with fire codes and/or other regulations, while cables exterior to the building may not need to comply with such codes and/or regulations. A splice enclosure may be provided for providing a space for receipt of many spliced optical fibers of many cables, for example, so that the optical fibers of exterior cables may be spliced to optical fibers of interior cables.

In some examples, the splice enclosure and related devices and methods may be configured to provide space for accommodating (e.g., storing and/or protecting) splicing of one or more higher fiber-count cables, such as, for example, 1728 fiber-count cables, 3456 fiber-count cables, and/or 6912 fiber-count cables. In some examples, one or more of the cables may be ribbon cables, for example, having optical fibers arranged adjacent to other optical fibers of the cables, such that the adjacent optical fibers are arranged substantially along a line forming a substantially flat ribbon including a plurality of optical fibers. In some examples, the cables may not be ribbon cables. Such examples of splice enclosures may accommodate the splicing of additional optical fibers in an efficient manner relative to conventional enclosures. Splicing for different purposes and/or different types of optical fibers is/are contemplated.

Figure 1:
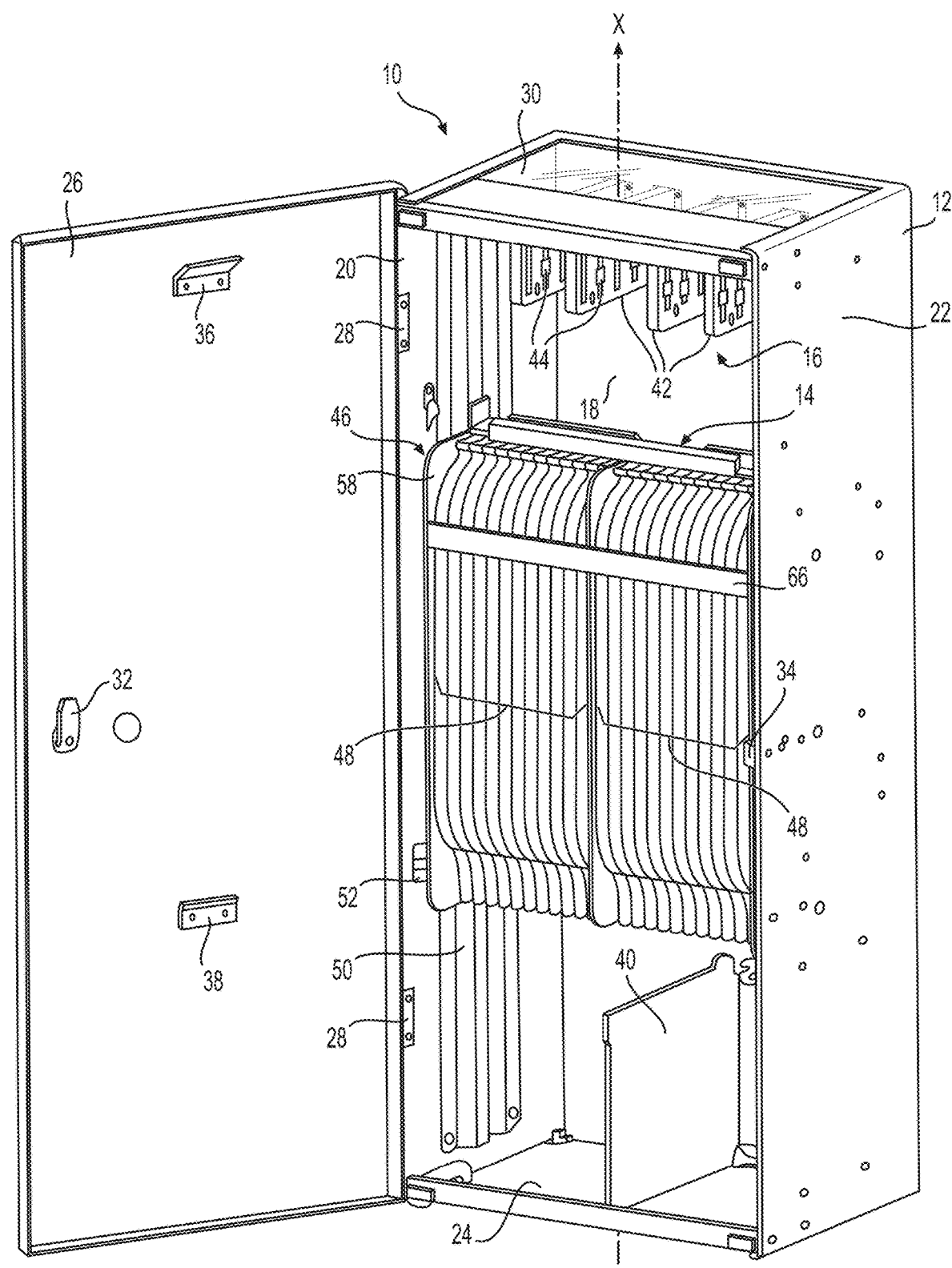
FIG. 1 is a schematic perspective view of an example splice enclosure including an example cabinet and an example splice tray assembly.

FIG. 1 is a schematic perspective view of an example splice enclosure 10 including an example cabinet 12 and an example splice tray assembly 14. In the example shown, the cabinet 12 defines an interior volume 16 and includes a rear wall 18, a first side wall 20 coupled to the rear wall 18, and a second side wall 22 coupled to the rear wall 18 and spaced from the first side wall 20. The example cabinet 12 shown in FIG. 1 also includes a lower wall 24 coupled to the first side wall 20, the second side wall 22, and/or the rear wall 18. In some examples, the lower wall 24 may include knock-outs and/or other structures (e.g., openings) for mounting the cabinet 12 to a support (e.g., a floor or platform) and/or to provide one or more entry points for one of more cables to pass from exterior to the cabinet 12 to the interior volume 16 of the cabinet 12. The example cabinet 12 also includes a front panel 26 coupled to the first side wall 20 and configured to pivot with respect to the first side wall 20. For example, the front panel 26 may serve as a door to gain access to the interior volume 16 of the cabinet 12 and may be mounted on hinges 28 to support the front panel 26 and permit pivoting of the front panel 26 relative to the remainder of the cabinet 12. The example cabinet 12 also includes an upper wall 30 coupled to one or more of the first side wall 20, the second side wall 22, and/or the rear wall 18. In some examples, the upper wall 30, or at least a portion thereof, may be removably coupled to the first side wall 20, the second side wall 22, and/or the rear wall 18, which may render it relatively easier for a technician installing the cables to access the cables as they are routed into the cabinet 12. In some examples, the upper wall 30 may include knock-outs and/or other structures (e.g., openings) for providing one or more entry points for one of more cables to pass from exterior to the cabinet 12 to the interior volume 16 of the cabinet 12. As shown, the cabinet 12 may define a longitudinal axis X extending in a direction parallel to planes in which the rear wall 18 and at least one of the first wall 20 or the second wall 22 lie. Although the terms "rear," "side," "front," "lower," and "upper" have been used for clarity and describing relative relationships among parts, the use of these terms is not intended to be absolute.

As shown in FIGS. 1-5, the cabinet 12 may also include a latch 32 coupled to the front panel 26 and a catch 34 coupled to the second wall 22 and configured to selectively secure the front panel 26 in the closed position. In the example shown, the front panel 26 may also include one or more hangers (e.g., hangers 36 and 38) coupled to an interior side of the front panel 26 and configured to facilitate hanging therefrom cables, splice trays associated with the splice tray assembly 14, and/or other parts related to the splice enclosure 10, which may improve the ease with which a technician may perform splicing or other service-related operations. In some examples, the bracket 36 may be configured to engage the upper wall 30. Some examples of the splice enclosure 10 may include one or more mounting brackets (e.g., coupled to rear wall 18) configured to couple the splice enclosure 10 to a support, such as, for example, a rack or a wall or support of the building in which the splice enclosure 10 is present.

As described in more detail herein, the splice enclosure 10 may also include a divider plate 40 in a lower portion of the cabinet 12 to assist with organizing the optical fibers being spliced. As explained in more detail herein, some examples of the splice enclosure 10 may also include one or more brackets 42 coupled to the cabinet 12 at an end of the cabinet 12 remote from the lower wall 24. For example, the one or more brackets 42 may be coupled to the rear wall 18, for example, via at least one of one or more fasteners, welding, or adhesives. In some examples, the one or more brackets may each include one or more apertures 44 configured to receive a boss associated with a clip configured to be coupled to at least one cable (e.g., via a cable-tie) and the respective bracket 42, for example, as explained in more detail herein.

Figure 6:
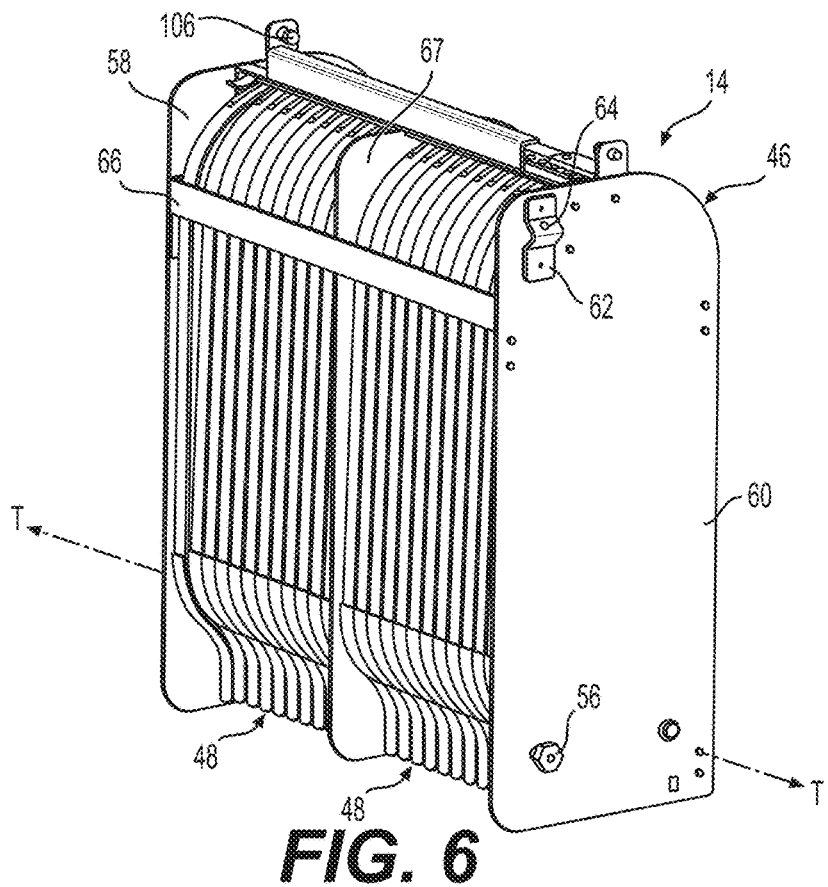
FIG. 6 is a schematic perspective view of an example splice tray assembly.
Figure 7:
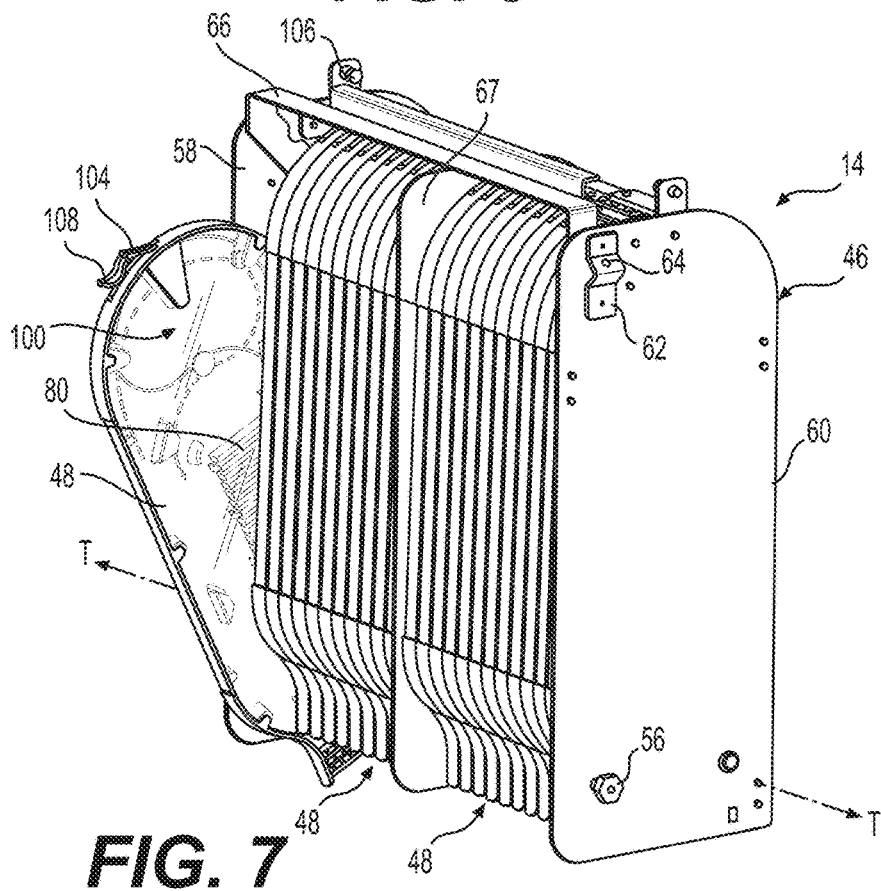
FIG. 7 is a schematic perspective view of the example splice tray assembly shown in FIG. 6 with an example splice tray in a pivoted position.
Figure 8:
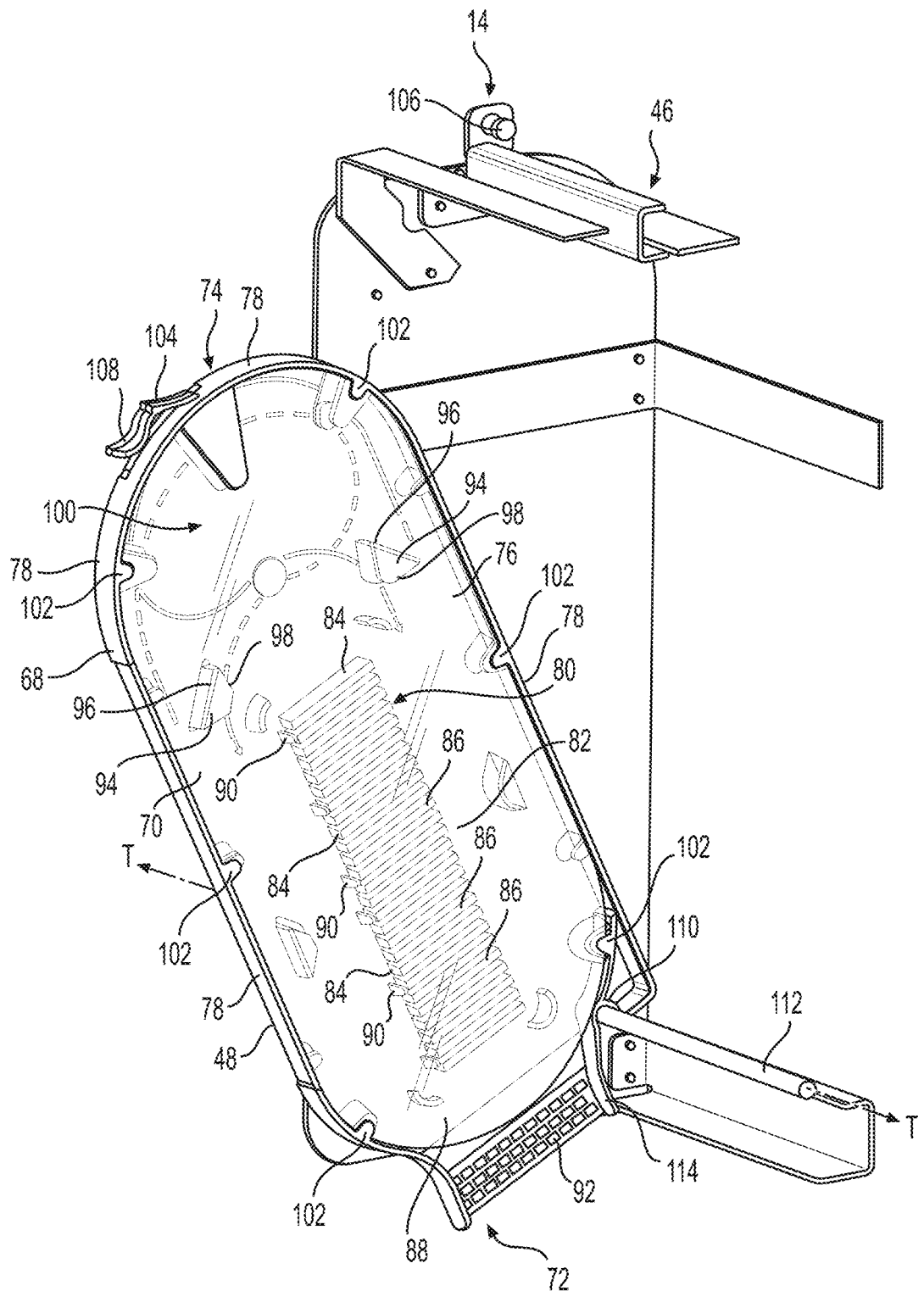
FIG. 8 is a schematic perspective view of an example splice tray pivoted relative to an example splice tray assembly support.

Referring to FIGS. 1-8, the example splice enclosure 12 includes a splice tray assembly 14. In the examples shown, the splice tray assembly 14 includes a splice tray housing 46 pivotally coupled to the cabinet 12 (see, e.g., FIG. 2) and a plurality of splice trays 48 coupled to the splice tray housing 46 (e.g., pivotally coupled to the splice tray housing 46, for example, as shown in FIGS. 7 and 8) and configured to provide a space for receipt of a plurality of spliced optical fibers of a plurality of cables. For example, the splice tray housing 46, in the example shown in FIG. 2, may be pivotally coupled to the cabinet 12, such that the splice tray housing 46 pivots about a housing pivot axis P extending in a direction substantially perpendicular with respect to the longitudinal axis X, for example, substantially parallel with respect to a plane in which the rear wall 18 lies. Such pivoting may render it relatively easier for a technician to gain access to one or more of the splice trays 48.

Figure 2:
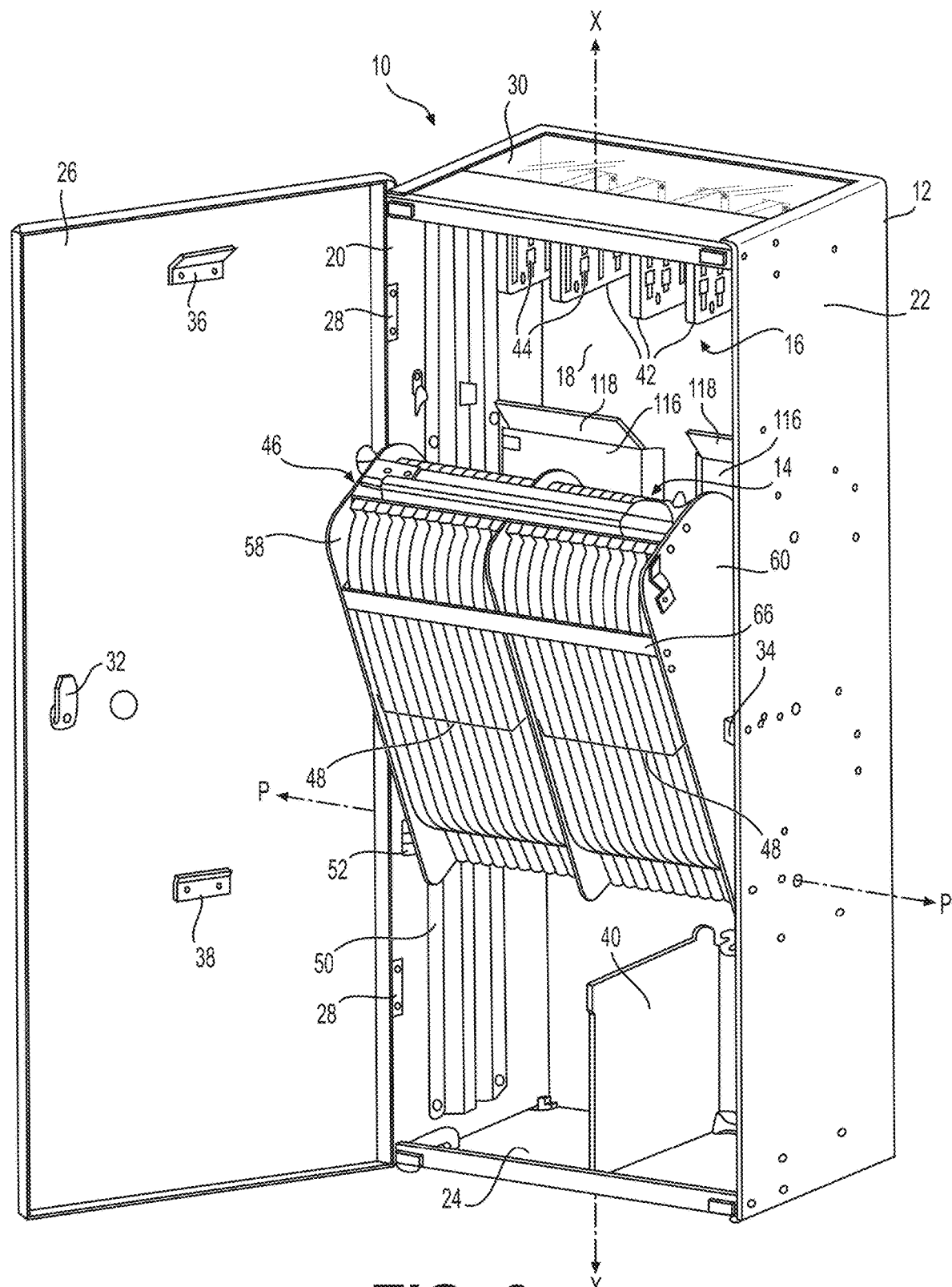
FIG. 2 is a schematic perspective view of the example splice enclosure shown in FIG. 1 with the example splice tray assembly in a pivoted position.
Figure 3:
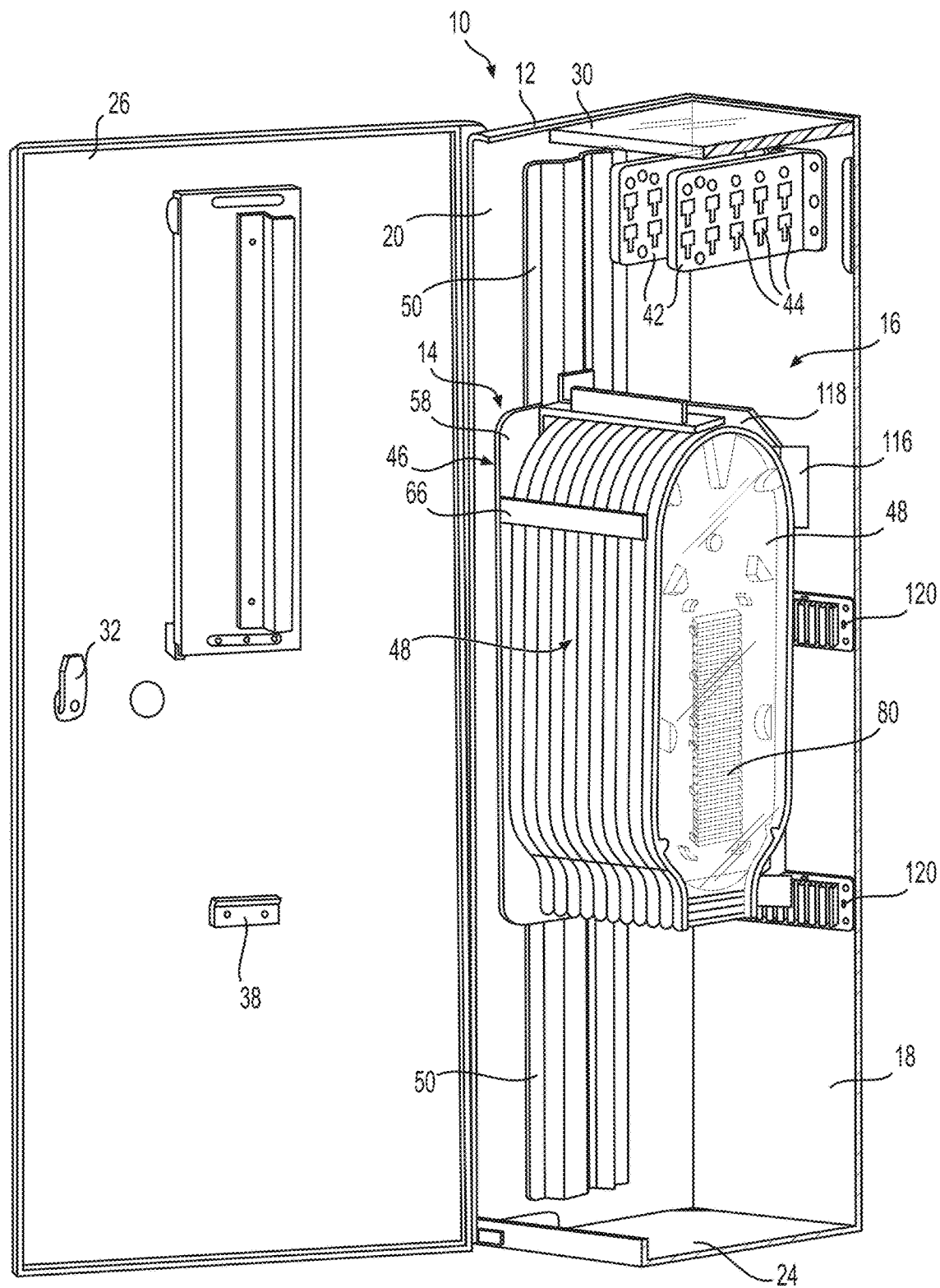
FIG. 3 is a schematic perspective partial section view of the example splice enclosure shown in FIG. 1 including an example splice tray assembly.
Figure 4:
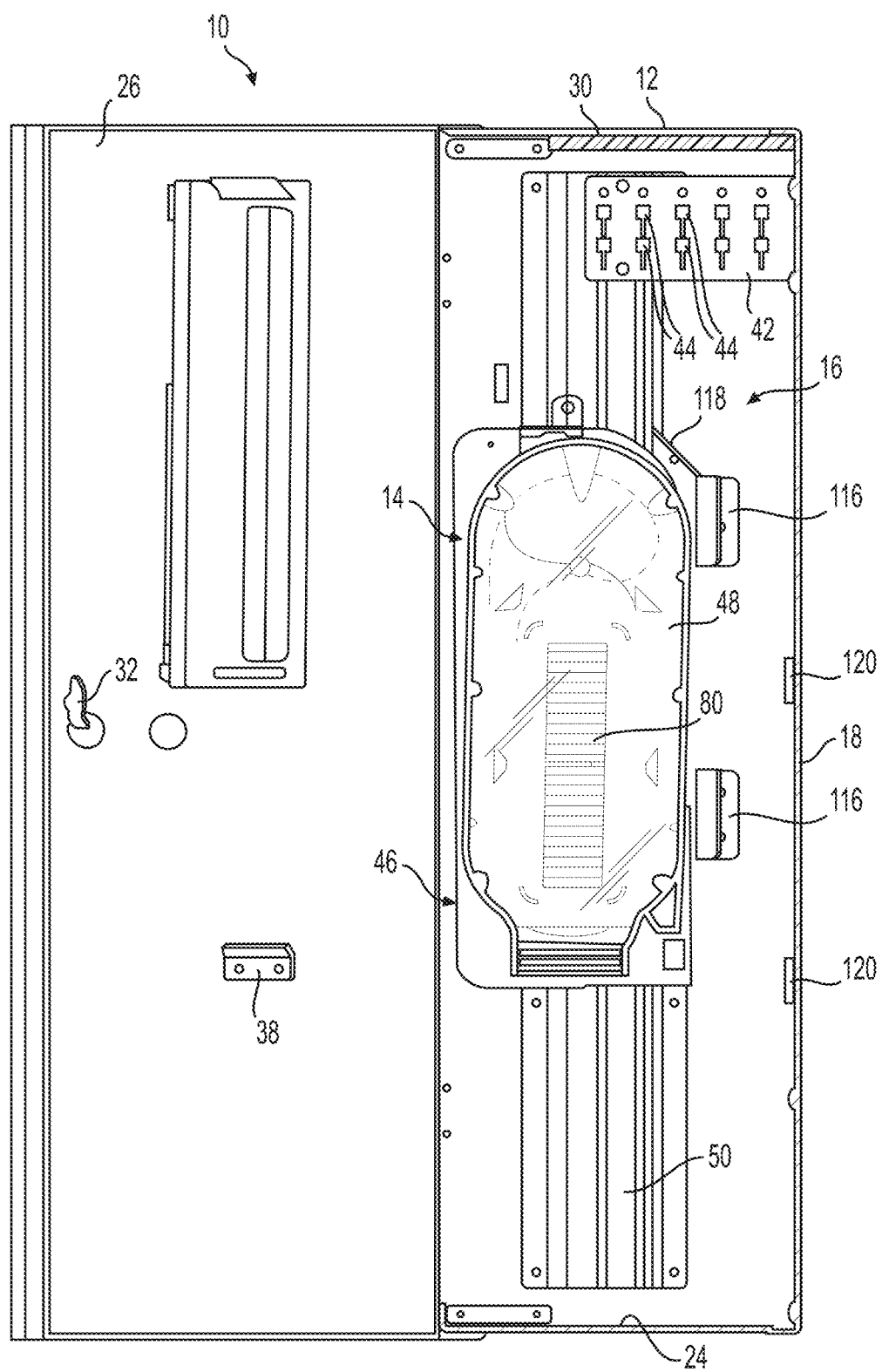
FIG. 4 is a schematic side section view of the example splice enclosure shown in FIG. 1.
Figure 5:
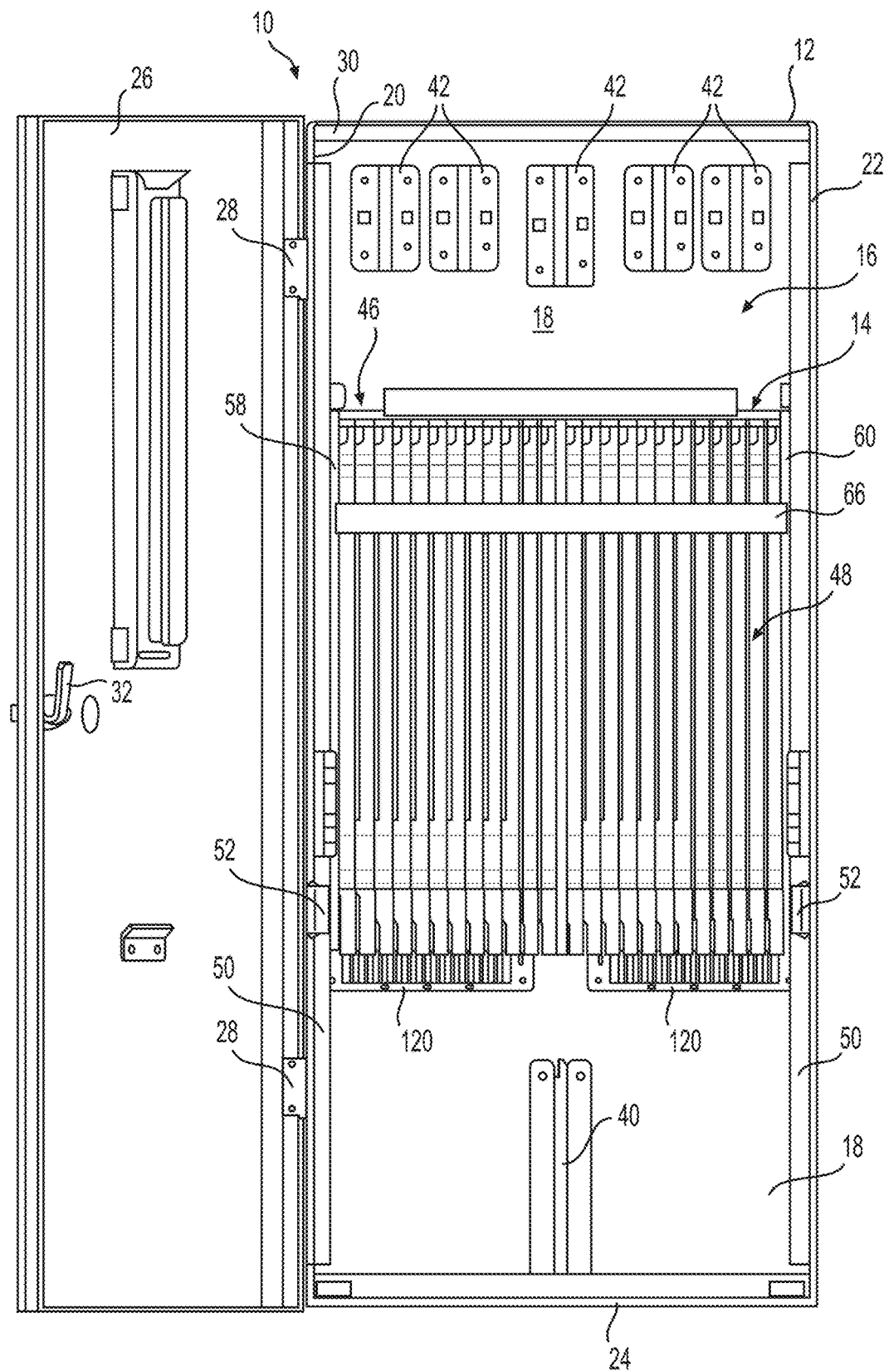
FIG. 5 is a schematic front view of the example splice enclosure shown in FIG. 1.
Figure 9:
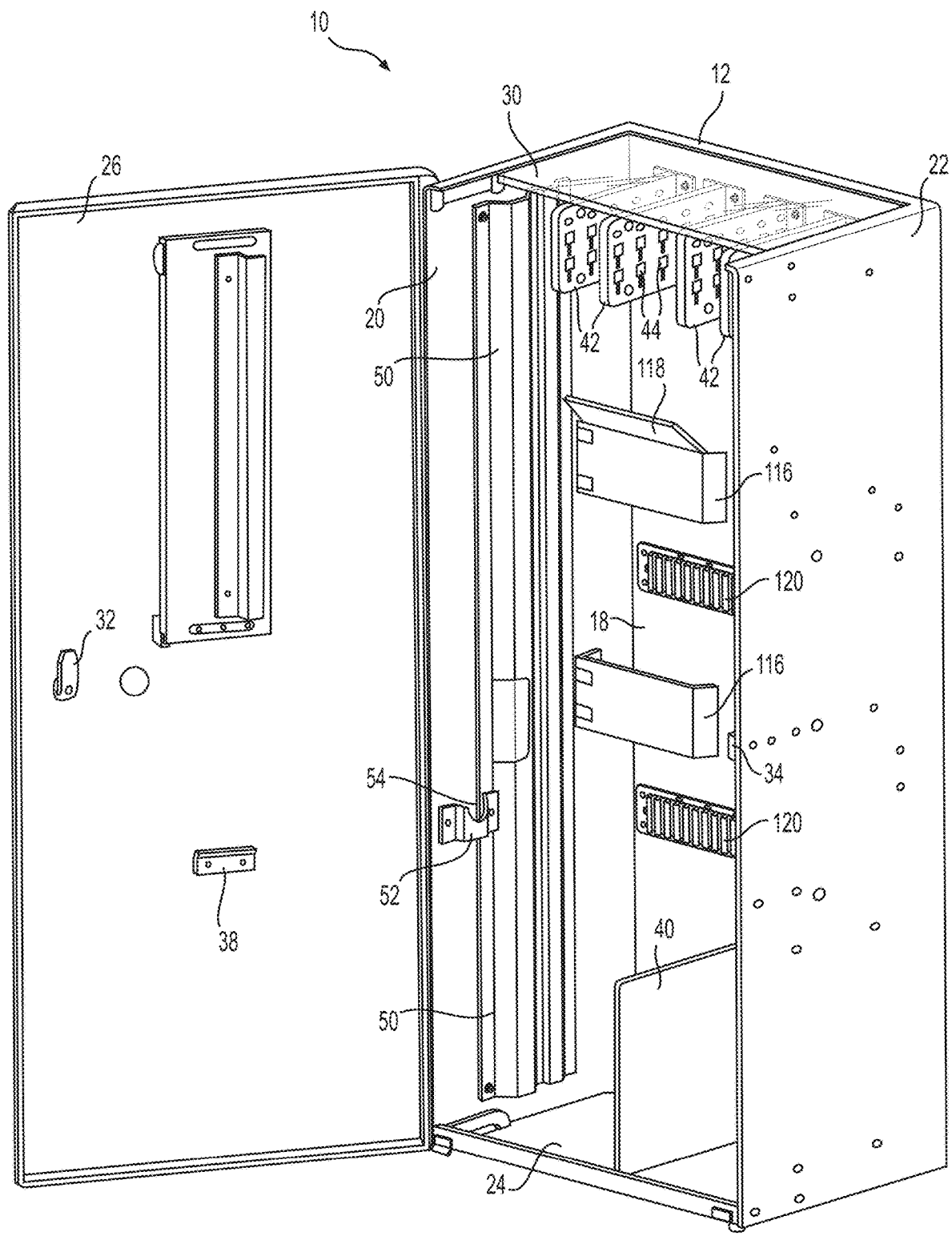
FIG. 9 is a schematic perspective view of the example splice enclosure of FIG. 1 with the splice tray assembly removed.
Figure 10:
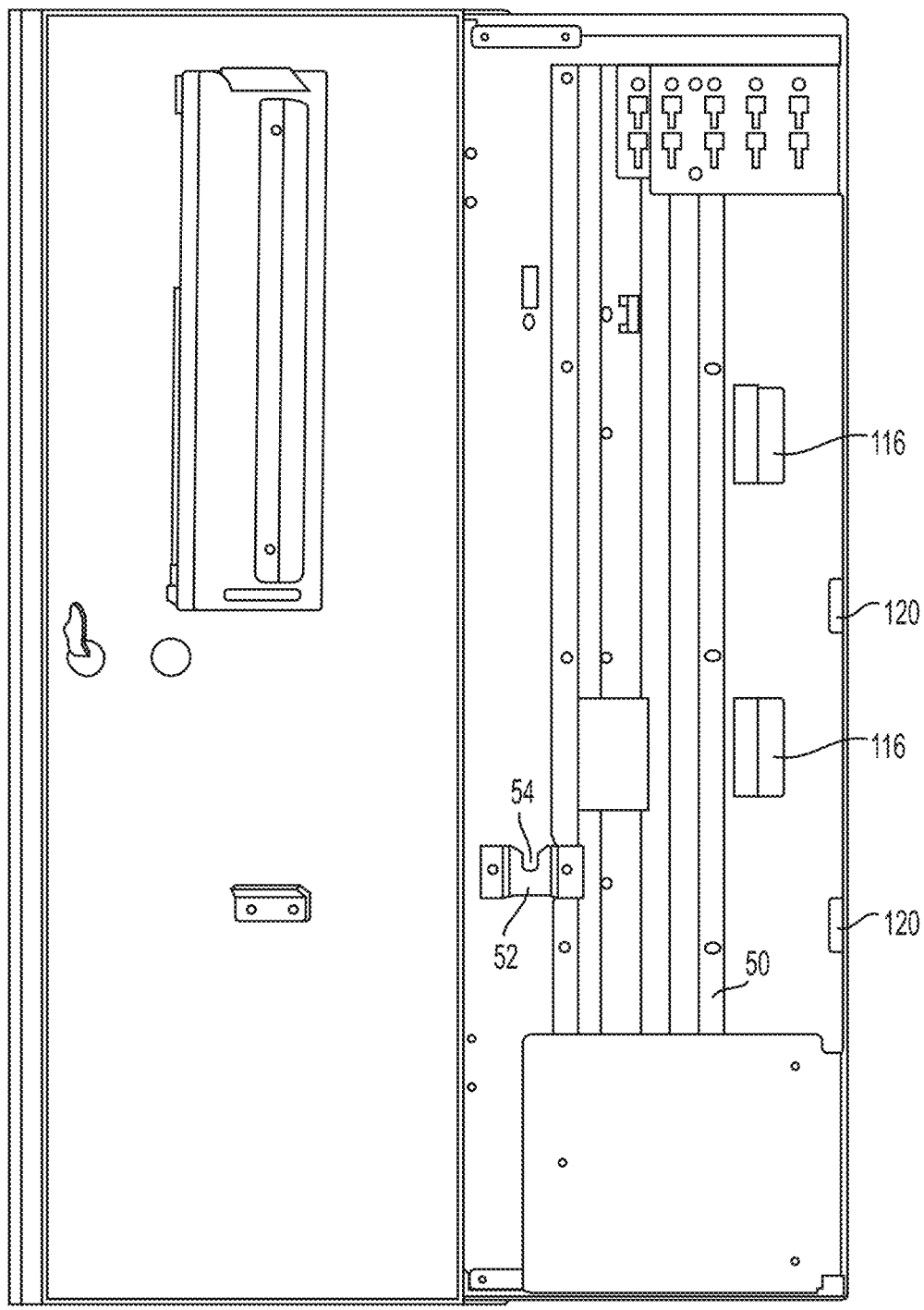
FIG. 10 is a schematic side section view of the example splice enclosure shown in FIG. 9.

As shown in FIG. 2, some examples of the splice enclosure 10 may include one or more support rails 50 coupled to the interior of each of the first side wall 20 and the second side wall 22 and extending substantially in the direction of the longitudinal axis X The support rails 50 may be configured to assist with support of the splice tray housing 46 and splice trays 48 within the cabinet 12. As shown in FIGS. 2, 9, and 10, housing support brackets 52 may be coupled to the interior of each of the first side wall 20 and the second side wall 22. The housing support brackets 52 may include a recess 54, and the splice tray housing 46 may include a pivot pin 56 at each of opposite ends of the splice tray housing 46. The pivot pins 56 may be received in respective recesses 54, for example, such that the splice tray housing 46 is pivotally supported with respect to the cabinet 12 and is able to be pivoted from an upright position (see, e.g., FIG. 1) to a pivoted position (see, e.g., FIG. 2). In some examples, the cabinet 12 and the splice tray assembly 14 define a passage between the rear wall 18 of the cabinet 12 and the splice tray assembly 14 configured for passage of a plurality of cables therethrough. In some examples, the splice tray housing 14 is releasably coupled to the cabinet 12 for separation of the splice tray housing 14 and splice trays 48 from the cabinet 12, for example, to provide access to the rear part of the cabinet 12 (e.g., the part of the cabinet 12 behind the splice tray housing 14). For example, the splice tray housing 14 may be lifted out of the recesses 54 of the housing support brackets 52, as explained herein.

As shown in FIGS. 6 and 7, the splice tray housing 46 may include a first end wall 58 and a second end wall 60 opposite the first end wall 58. In the example shown in FIGS. 6 and 7, each of the first and second end walls 58 and 60 includes a pivot pin 56 mounted thereon at a lower portion of the respective first and second end walls 58 and 60 and at a portion of the first and second end walls 58 and 60 closer to the front of the cabinet 12 (e.g., opposite the rear wall 18) when the splice tray assembly 14 is mounted in the cabinet 12. This may result in biasing the splice tray assembly 14 from pivoting outward toward the technician, unless the technician pulls an upper end of the splice tray assembly 14 outward. In some examples, a latch may be provided on the splice tray assembly 14 and/or the first and second side walls 20 and 22 of the cabinet 12 to selectively the secure the splice tray assembly 14 in the upright position. Some examples may also include a pivoting limiting assembly configured to prevent the splice tray assembly 14 from pivoting past a predetermined angular displacement. For example, as shown in FIGS. 2, 6, and 7, a limiting bracket 62 may be provided on one or more of the exterior surface of the first end wall 58 or the second end wall 60 for cooperating with a limiting member coupled to the cabinet 12 to prevent the splice tray assembly 14 from pivoting past a predetermined angular displacement. The limiting member may be a cable, a hook, a strut, etc., configured to be received in a hole 64 in the limiting bracket 62 and limit the angular displacement.

As shown in FIGS. 6-8, in some examples, one or more of the plurality of splice trays 48 may be pivotally coupled to the splice tray housing 46, for example, such that the one or more splice trays 48 pivots relative to the splice tray housing 46 about a splice tray pivot axis T extending in a direction substantially perpendicular with respect to the longitudinal axis X of the cabinet 12 and substantially parallel with respect to the plane in which the rear wall 18 lies. Pivoting of the splices trays 48 may render it relatively easier for a technician to splice the optical fibers in the splice trays 48 and/or to check the quality of the splice or splices. The example shown in FIGS. 6-8 includes a retainer 66 extending between the first end wall 58 and the second end wall 60 configured to prevent one or more or the splice trays 48 from pivoting outward relative to the splice tray housing 46. For example, opposite ends of the retainer 66 may be coupled to the first and second end walls 58 and 60 of the splice tray housing 46, so that the retainer 66 may be pivoted between a first position preventing the splice trays 48 from pivoting to a second position permitting the splice trays 48 to pivot. For example, FIG. 6 shows the retainer 66 in the first position, preventing the splice trays 48 from pivoting relative to the splice tray housing 46, and FIG. 7 shows the retainer 66 in the second position, allowing the splice trays 48 to pivot relative to the splice tray housing 46. As shown in FIGS. 6 and 7, the example splice tray housing 46 also includes a divider panel 67 separating some of the splice trays 48 from others of the splice trays 48 (e.g., a first half of the splice trays 48 from a second half of the splice trays 48). This may render it relatively easier for the technician to organize the cables, optical fibers, and/or splices.

As shown in FIG. 8, one or more of the splice trays 48 may be provided for providing a space for receipt of a plurality of spliced optical fibers of a plurality of cables. For example, as shown in FIG. 8, the splice trays 48 may include a tray base 68 including a substantially planar base panel 70 having an entry end 72 and a remote end 74 spaced from the entry end 72. The base panel 70 may define a perimeter 76 and a flange 78 associated with the perimeter 76 of the base panel 70 and extending outward from the base panel 70. The example splice tray 48 shown in FIG. 8 also includes a splice holder 80 configured to hold a plurality of spliced optical fibers. In some examples, the splice holder 80 may include a holder base 82 removably coupled to the tray base 68, and a plurality of ribs 84 associated with the holder base 82 and defining a plurality of recesses 86 configured to receive at least one pair of spliced optical fibers. The splice tray 48 may also include a cover 88 removably coupled to at least one of the tray base 68 or the splice holder 80 and substantially enclosing the splice holder 80 between the tray base 68 and the cover 88. In some examples, the cover 88 may be translucent or transparent. Such examples may permit a technician to view the splices without removing the cover 88, for example, to check the quality of the splices using known visual splice-checking techniques.

In the example shown in FIG. 8, the splice tray 48 may also include a plurality of resilient hooks 90 extending outward from the base panel 78 and removably coupling the splice holder 80 to the tray base 68. This example configuration may permit the splice holder 80 to be separated from the splice tray 48 to facilitate placement of splices in the recesses 86, after which the splice holder 80 may be reengaged with the tray base 68 via the hooks 90.

In some examples, the tray base 68 of the splice tray 48 may include a plurality of apertures 92 at the entry end 72 configured to facilitate coupling of at least one cable and/or optical fiber to the splice tray 48. For example, a cable-tie may be wrapped partially around a cable or optical fiber and threaded through two (or more) of the apertures 92, after which the cable-tie may be tightened to secure the cable and/or optical fiber to the entry end 72 of the splice tray 48.

As shown in FIG. 8, the splice trays 48 may also include a plurality of retainer tabs 94 configured to retain at least one optical fiber. For example, the retainer tabs 94 may each extend outward from the tray base 68 to a remote tab end 96. In some examples, a retainer flange 98 may extend from the remote tab end 96 in a direction substantially parallel with respect to the base panel 70. The retainer tabs 94 may assist with organizing the cables and/or optical fibers within the splice tray 48. In some examples, for example, as shown in FIG. 8, the tray base 68 may define a storage zone 100 between the splice holder 80 and the remote end 74 of the tray base 68. The storage zone 100 may be configured to provide space for receiving excess length of at least one cable and/or optical fiber.

The example splice tray 48 shown in FIG. 8 also includes a plurality of cover tabs 102 extending from the tray base 68 and configured to removably couple the cover 88 to the tray base 68. The cover tabs 102 may facilitate access to the interior of the splice tray 48 and thereafter may be used to secure the cover 88 to the tray base 68.

As shown in FIG. 8, some examples of the splice tray 48 may include a flexible latch 104 extending from an outer surface of the flange 78 of the tray base 68 (e.g., at the remote end 74 of the tray base 68). The latch 104 may be configured to selectively prevent and allow the splice tray 48 to pivot with respect to the splice tray assembly 14 to which the splice tray 48 is coupled. For example, when the splice tray 48 is in the unpivoted position (see, e.g., FIG. 6), the latch 104 may engage a latch catch 106, which is schematically shown in FIG. 8. To disengage the latch 104 from the latch catch 106, an extension 108 of the latch 104 may be flexed toward the flange 78 to disengage the latch 104 from the latch catch 106, such that the splice tray 48 may be pivoted with respect to the splice tray housing 46, for example, as shown in FIGS. 7 and 8.

In some examples, such as shown in FIG. 8, the splice tray 48 may include a pivot recess 110 defined by the tray base 68 and configured to cooperate with a pivot support 112 of a splice tray assembly 14 (e.g., of the splice tray housing 46) to facilitate pivoting of the splice tray 48 with respect to the splice tray assembly 14. For example, the pivot recess 110 may form a semi-circular bearing surface for rotation relative to the pivot support 112. Some examples may also include a pivot stop 114 associated with the pivot recess 112 and configured to limit a pivot angle through which the splice tray 48 pivots relative to the splice tray assembly 14 (e.g., the splice tray housing 46). In some examples, the pivot stop 114 may include an abutment surface located adjacent the pivot recess 110 and configured to engage a portion of the pivot support 112.

As shown in FIGS. 9 and 10, some examples of the splice enclosure 10 may also include one or more cable organizers 116. For example, the cable organizers 116 may include a bracket coupled to the rear wall 18 of the cabinet 12. It is contemplated that one more cable organizers 116 may be coupled to other portions of the cabinet 12. In the example shown, the cable organizers 116 and the rear wall 18 form a passage through which one or more cable and/or optical fibers may pass. As shown in FIG. 9, some examples of the cable organizer 116 may include flap 118, which may extend obliquely with respect to the cable organizer 116, and the flap 118 may render it relatively easier for a technician to pass one or more cables and/or optical fibers through the cable organizer 116. As shown in FIG. 2, for example, one or more of the cable organizers 116 may each be substantially aligned with half the splice trays 48, and one or more cable organizers 116 may be substantially aligned with another half of the splice trays 48. This may assist the technician with maintaining organization of the cables and/or optical fibers during a splicing operation.

Figure 11:
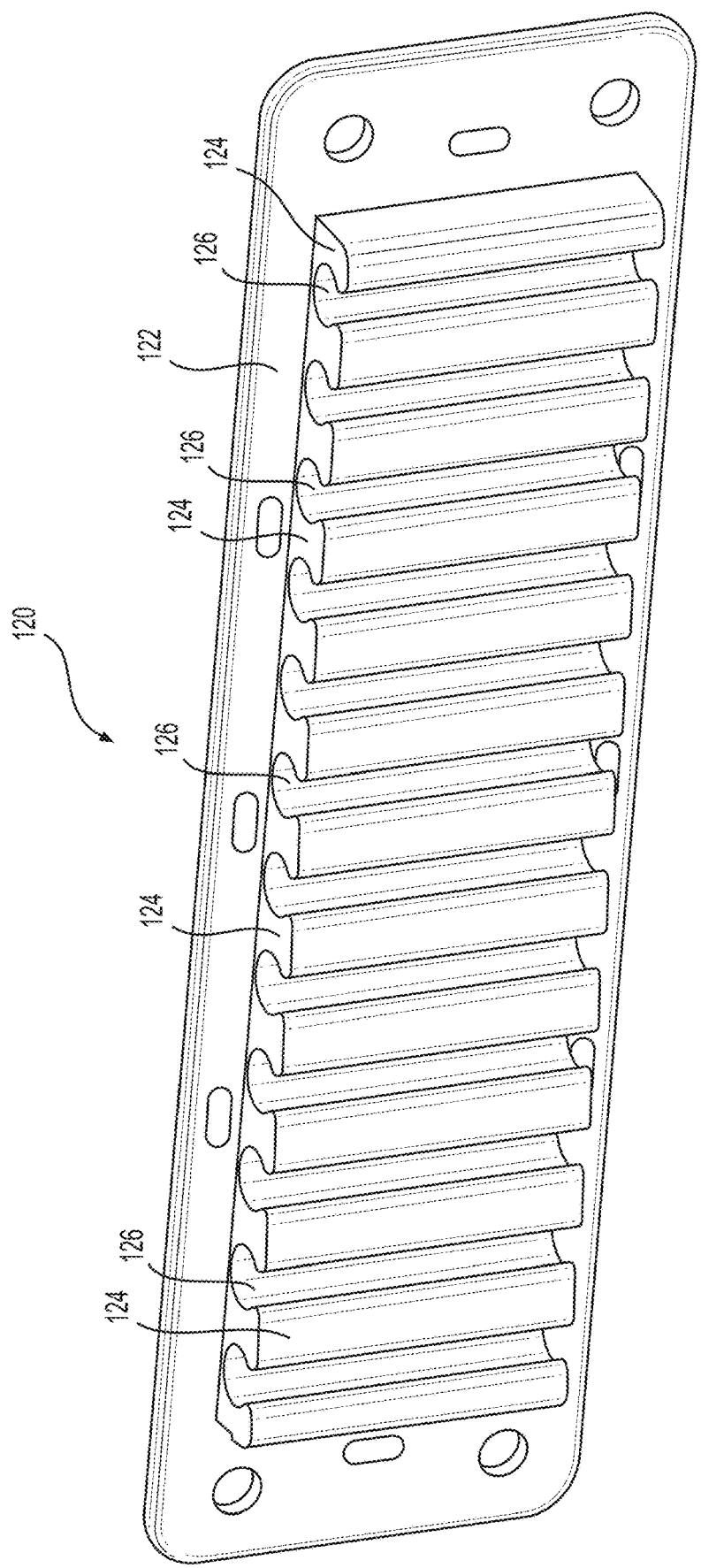
FIG. 11 is a schematic perspective view of an example cable holder.

As shown in FIGS. 3-5 and 9-11, the splice enclosure 10 may also include one or more cable retainers 120 configured to assist with organizing the cables and/or optical fibers in the cabinet 12. For example, the cable retainers 120 may be coupled to the rear wall 18 of the cabinet 12. It is contemplated that one more cable retainers 120 may be coupled to other portions of the cabinet 12. As shown in FIG. 11, some examples of the cable retainers 120 may include a retainer base 122 and a plurality of retainer ribs 124 associated with the retainer base 122 and defining a plurality of retainer recesses 126 configured to receive at least one cable and/or optical fiber.

Figure 12:
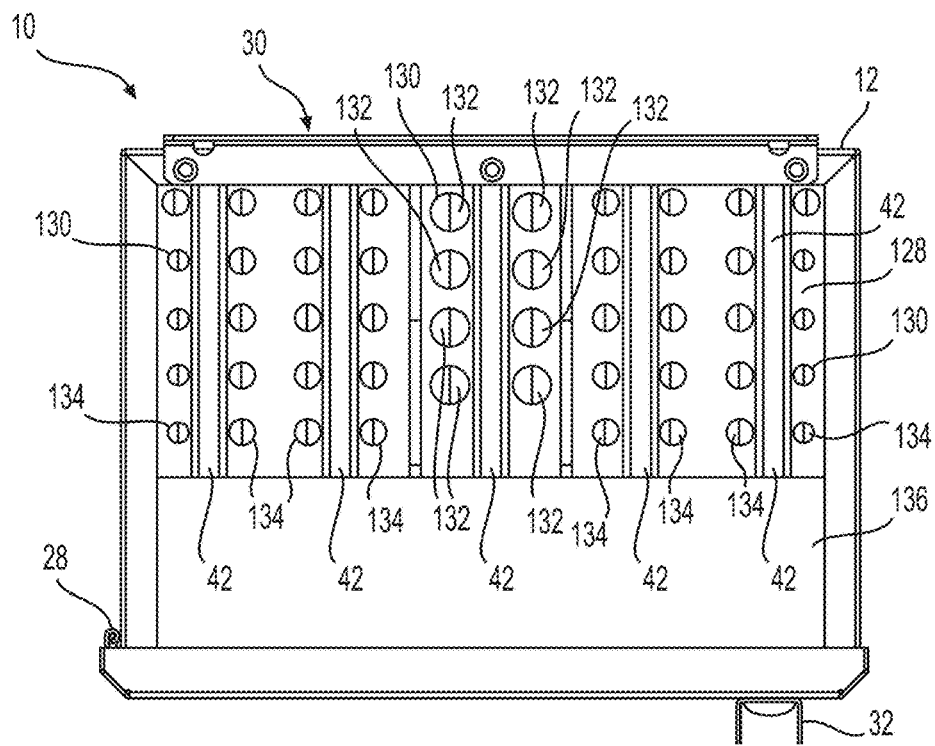
FIG. 12 is a schematic top view of an example splice enclosure showing an example upper wall.
Figure 13:
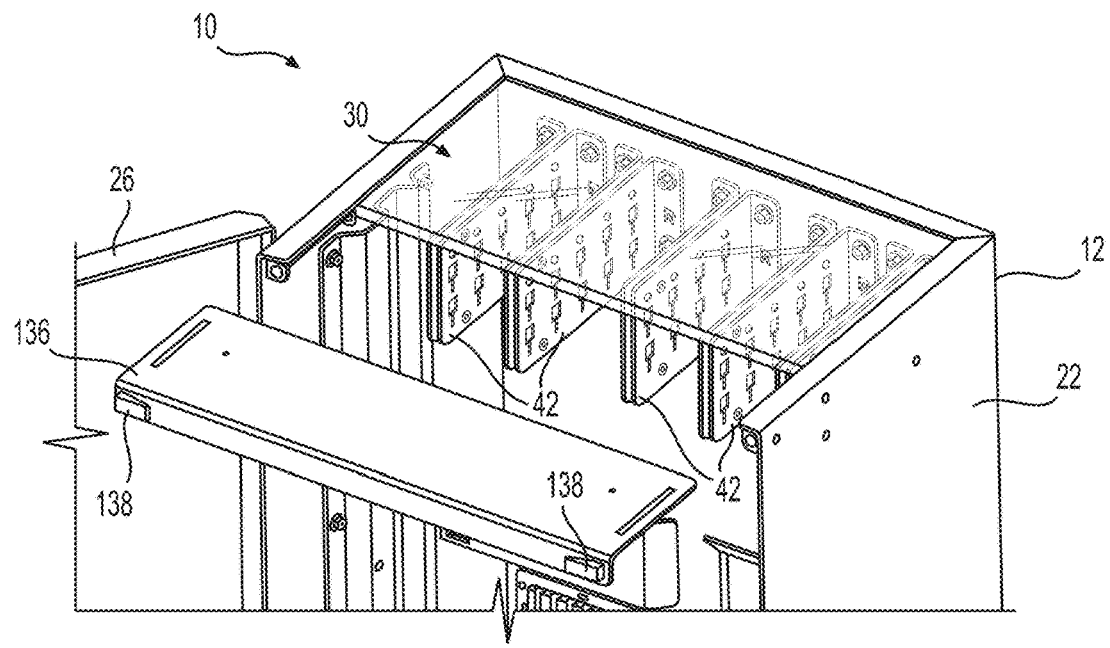
FIG. 13 is a schematic perspective view of an upper portion of an example splice enclosure including an example upper wall removed from the upper portion of the splice enclosure.

FIG. 12 is a schematic top view of an example splice enclosure 10 showing an example upper wall 30, and FIG. 13 is schematic perspective view of an upper portion of an example splice enclosure 10 including an example upper wall 30 removed from the upper portion of the splice enclosure 10. As shown in FIGS. 12 and 13, the example upper wall 30 may include an entry plate 128 including a plurality of apertures 130 for receiving one or more cables and/or one or more optical fibers to facilitate passage of the cables and/or optical fibers into and out of the splice enclosure 10. For example, the apertures 130 may include exterior apertures 132 for receiving exterior cables, for example, from exterior the building, so that the exterior cables may be routed into the cabinet 12. The apertures 130 may also include interior apertures 134 for receiving interior cables, for example, from the interior of the building, so that the interior cables may be routed into the cabinet 12 for splicing with the exterior cables. The apertures 130, including the exterior apertures 132 and/or the interior apertures 134 may be configured to receive the same types of cables or types of cables different than the exterior cables and/or the interior cables.

In some examples, for example, as shown in FIGS. 12 and 13, the upper wall 30 may include a removable portion 136 configured to be removably coupled to at least one of the first side wall 20, the second side wall 22, or the rear wall 18. For example, the removable portion 136 may include panel latches 138 at opposite ends of the removable portion 136 and configured to permit the removable portion 136 to be selectively separated from the cabinet 12. This may provide a technician with relatively improved access to an upper portion of the interior volume 16 of the cabinet 12, for example, when installing cables and/or optical fibers and/or performing a splicing operation.

Figure 14:
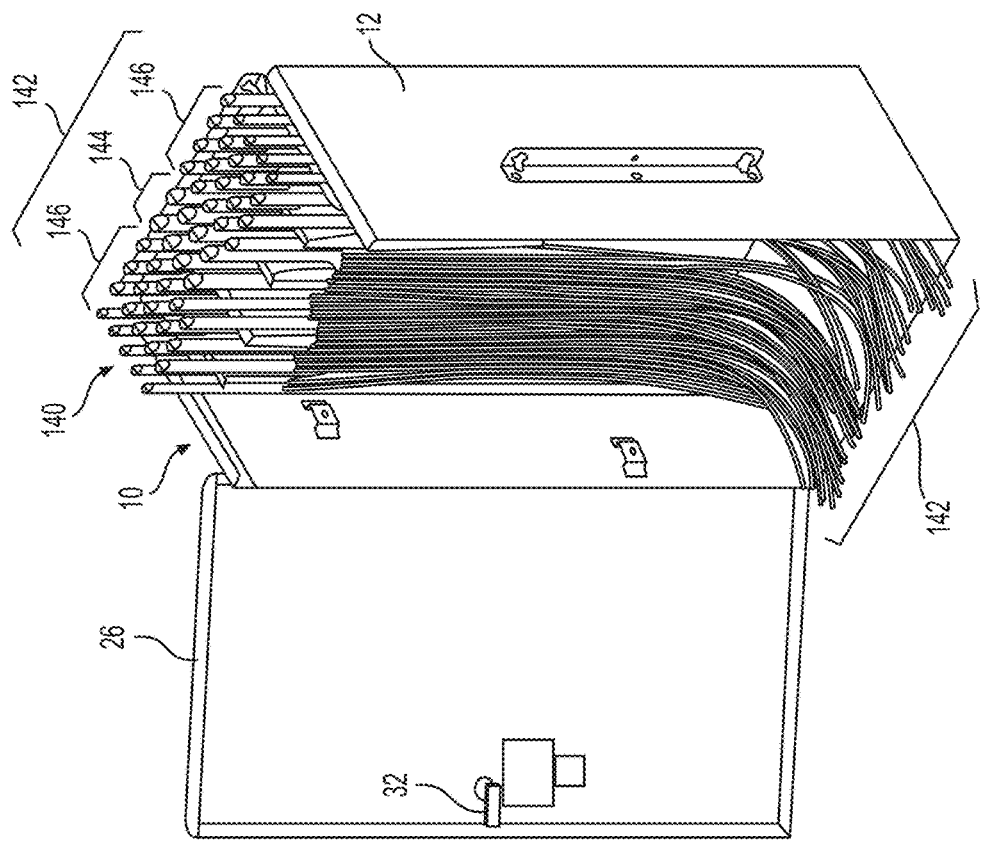
FIG. 14 is a schematic perspective view of an example assembly including a plurality of cables and an example splice enclosure receiving the plurality of cables, shown without a splice tray assembly.

FIGS. 14-17 show an example assembly 140 including a plurality of cables 142 and an example splice enclosure 10 receiving the plurality of cables 142. FIG. 14 shows an example assembly 140 without a splice tray assembly 14 removed. For example, when performing a splicing operation, a technician might remove (or leave out) the splice tray assembly 14 in order to route the cables 142 into the splice enclosure 10. For example, the cables 142 may include exterior cables 144 that have been routed from outside the building to inside the building for splicing to interior cables 146 that provide (or are coupled to) a communications network inside the building. As shown in FIG. 14, for example, at least portions of the upper wall 30 may be separated from (or not coupled to) the upper portion of the splice enclosure 10, and the exterior cables 144 may be routed into the upper portion of the splice enclosure 10 at a central portion 148 of the upper portion of the splice enclosure 10. The interior cables 146 may be routed into the upper portion of the splice enclosure 10 at lateral portions 150 of the splice enclosure 10. This may help organize the cables 142 and render is relatively easier for the technician to distinguish the exterior cables 144 from the interior cables 146 prior to splicing the cables 142. As explained previously herein, some examples of the cabinet 12 include brackets 42 for coupling the cables 142 to the cabinet upon entry into the cabinet 12, for example, using cable-ties and the apertures 44 in the brackets 42. As shown in FIG. 14, a technician may route the cables 142 into the cabinet 12, such that the cables 142 drop down into the lower end of the cabinet 12 prior to being spliced.

Figure 15:
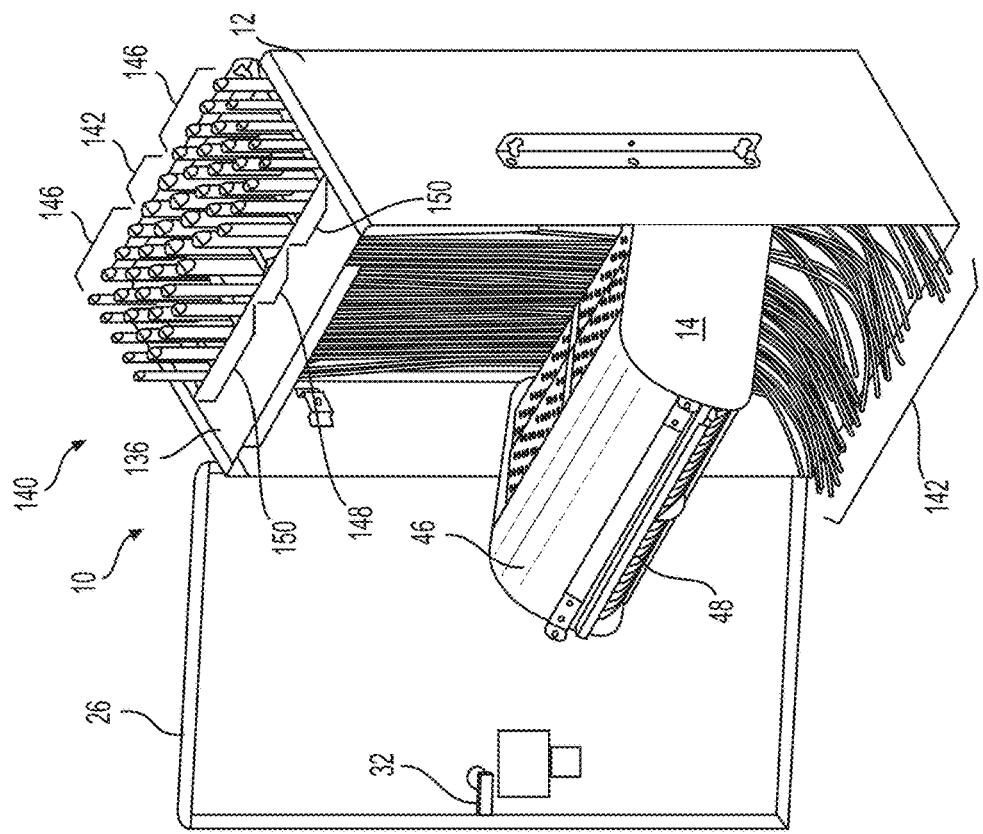
FIG. 15 is a schematic perspective view of the example assembly shown in FIG. 14 with an example splice tray assembly in a pivoted position.

As shown in FIG. 15, after the cables 142 have been routed into the cabinet 12, for example, as shown in FIG. 14, a splice tray assembly 14 may be moved into position into cabinet 12. For example, as described herein, the pivot pins 56 on the splice tray housing 46 may be inserted into respective recesses 54 of the housing support brackets 52, and as shown in FIG. 15, the splice tray housing 46 may be pivoted about the pivot pins 56, so that the splice trays 48 are more easily accessible to the technician for performing the splices and inserting the splices into the splice trays 48. As shown in FIG. 15, the cables 142 may be may pass between the rear side of the splice tray assembly 14 and the rear wall 18 of the cabinet 12.

Figure 17:
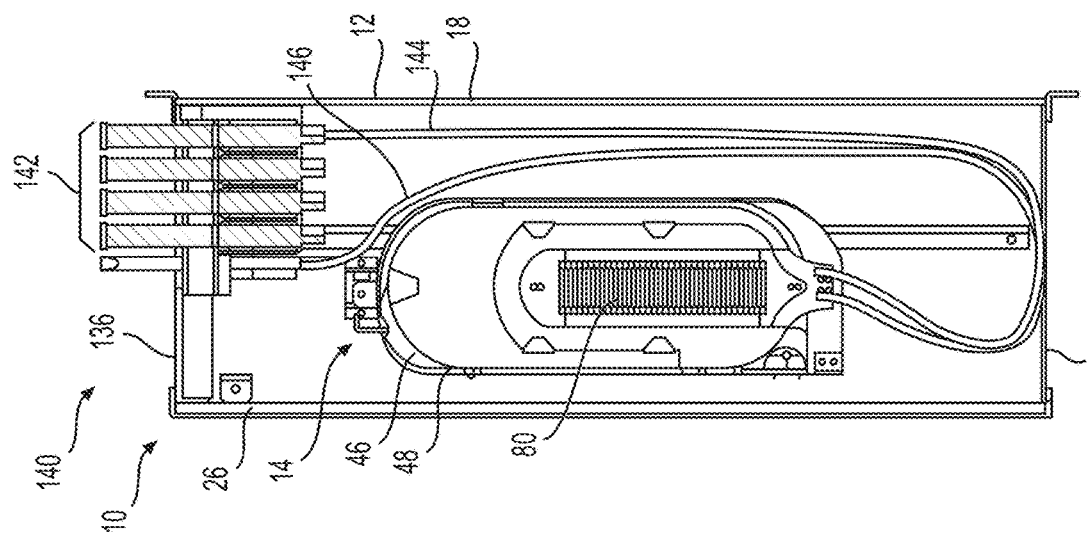
FIG. 17 is a schematic side section view of the example assembly shown in FIG. 14 with example cables entering an example splice tray.
Figure 16:
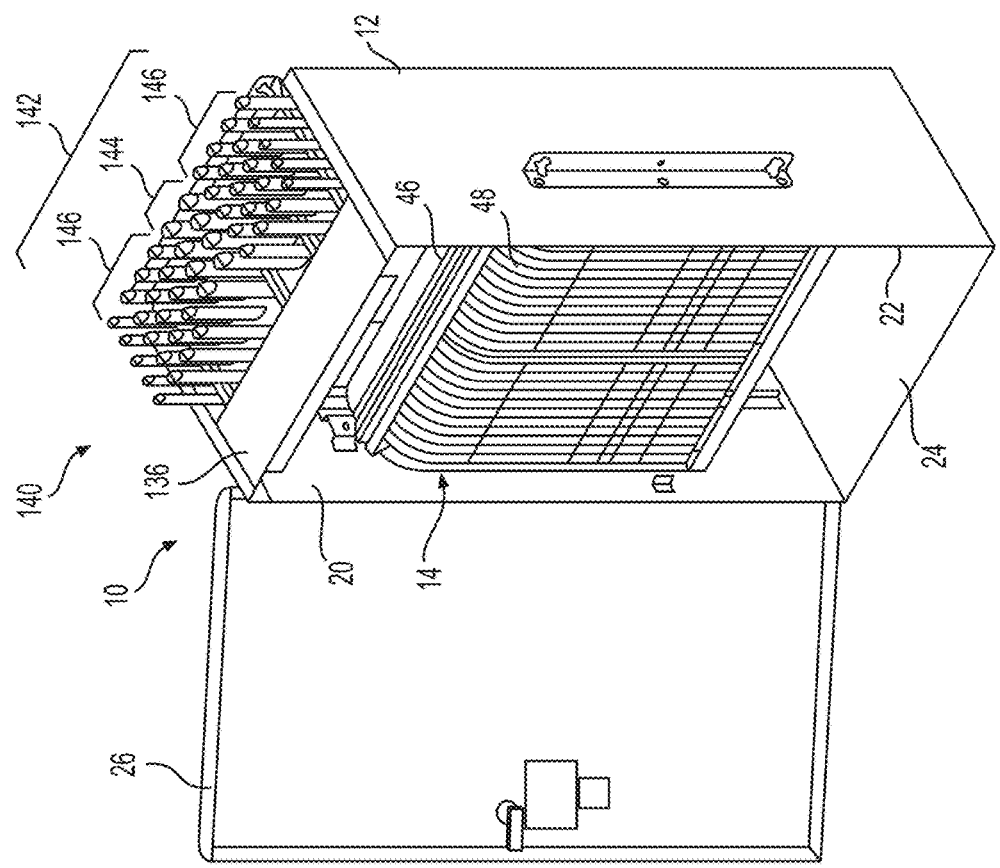
FIG. 16 is a schematic perspective view of the example assembly shown in FIG. 14 with an example splice tray assembly in an un-pivoted position.

FIGS. 16 and 17 show the example assembly shown in FIGS. 14 and 15 with the example splice tray assembly 14 in an un-pivoted position. For example, after the technician has spliced the cables 142, the splice tray assembly 14 may be pivoted to an upright position, as shown in FIGS. 16 and 17, and the splice tray assembly 14 may be secured in the upright position as described herein. As explained herein, in some examples, one or more of the splice trays 48 may be individually pivoted for ease of access by the technician when performing the splicing.

FIG. 17 is a side section view of the example assembly 140 with example cables 142 entering the example splice tray 48. For example, one of the exterior cables 144 is coupled to the bracket 42 as it enters the upper end of the cabinet 12, and thereafter passes between the splice tray assembly 14 and the rear wall 18 of the cabinet 12, loops down toward the lower wall 24 and back up into the splice tray 48, where the optical fibers of the exterior cable 144 are spliced to optical fibers of the interior cables 146. Similar to the exterior cables 144, the interior cables 146 are coupled to the bracket 42 as they enter the upper end of the cabinet 12 (FIG. 17 shows a single interior cable 146), and thereafter pass between the splice tray assembly 14 and the rear wall 18 of the cabinet 12, loop down toward the lower wall 24 and back up into the splice tray 48, where the optical fibers of the interior cables 146 are spliced to optical fibers of the exterior cables 144.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Example Clauses

A. A splice enclosure for providing a space for receipt of a plurality of spliced optical fibers of a plurality of cables, the splice enclosure comprising:
  a cabinet defining an interior volume and comprising:
  a rear wall;
  a first side wall coupled to the rear wall;
  a second side wall coupled to the rear wall and spaced from the first side wall;
  a lower wall coupled to at least one of the first side wall, the second side wall, or the rear wall; and
  a front panel coupled to the first side wall,
  wherein the cabinet defines a longitudinal axis extending in a direction parallel to planes in which the rear wall and at least one of the first wall or the second wall lie; and
    a splice tray assembly comprising:
    a splice tray housing pivotally coupled to the cabinet; and
    a plurality of splice trays pivotally coupled to the splice tray housing and configured to provide a space for receipt of a plurality of spliced optical fibers of a plurality of cables,
  wherein the splice tray housing is pivotally coupled to the cabinet, such that the splice tray housing pivots about a housing pivot axis extending in a direction substantially perpendicular with respect to the longitudinal axis and substantially parallel with respect to the plane in which the rear wall lies.

B. The splice enclosure of example A, wherein in the splice tray housing comprises a first end wall defining a first plane substantially parallel to the first side wall of the cabinet, and a second end wall defining a second plane substantially parallel to the first plane, and wherein the plurality of splice trays is coupled to the splice tray housing between the first wall and the second wall.

C. The slice enclosure of example A or example B, further comprising a pivot stop coupled to the cabinet and the splice tray housing and configured to limit a pivot angle through which the splice tray housing pivots relative to the cabinet.

D. The splice enclosure of any one of example A through example C, wherein the splice tray housing is releasably coupled to the cabinet for separation of the splice tray housing and splice trays from the cabinet.

E. The splice enclosure of any one of example A through example D, wherein at least one of the plurality of splice trays is pivotally coupled to the splice tray housing, such that the at least one of the plurality of splice trays pivots about a splice tray pivot axis extending in a direction substantially perpendicular with respect to the longitudinal axis of the cabinet and substantially parallel with respect to the plane in which the rear wall lies.

F. The splice enclosure of any one of example A through example E, wherein at least one of the plurality of splice trays is coupled to the splice tray housing, such that the at least one of the plurality of splice trays is independently pivotable relative to the splice tray housing.

G. The splice enclosure of any one of example A through example F, wherein the cabinet further comprises an upper wall removably coupled to at least one of the first side wall, the second side wall, or the rear wall, the upper wall configured to provide at least one entry point for a plurality of cables.

H. The splice enclosure of any one of example A through example G, further comprising a bracket coupled to the cabinet at an end of the cabinet remote from the lower wall, the bracket including an aperture configured to receive a boss associated with a clip configured to be coupled to at least one cable and the bracket.

I. The splice enclosure of any one of example A through example H, wherein the cabinet and the splice tray assembly define a passage between the rear wall of the cabinet and the splice tray assembly configured for passage of a plurality of optical fibers therethrough.

J. An example splice enclosure for providing a space for receipt of a plurality of spliced optical fibers of a plurality of cables, the splice enclosure comprising:
  a cabinet defining an interior volume and comprising:
    a rear wall;
    a first side wall coupled to the rear wall;
    a second side wall coupled to the rear wall and spaced from the first side wall;
    a lower wall coupled to at least one of the first side wall, the second side wall, or the rear wall; and
    a front panel coupled to the first side wall;
  a splice tray assembly comprising:
    a splice tray housing coupled to the cabinet; and
    a plurality of splice trays coupled to the splice tray housing and configured to provide a space for receipt of a plurality of spliced optical fibers of a plurality of cables; and
  a bracket coupled to the cabinet at an end of the cabinet remote from the lower wall, the bracket including an aperture configured to receive a boss associated with a clip configured to be coupled to at least one cable and the bracket.

K. The splice enclosure of example J, wherein the cabinet further comprises an upper wall removably coupled to at least one of the first side wall, the second side wall, or the rear wall, the upper wall configured to provide at least one entry point for a plurality of cables.

L. The splice enclosure of example J or example K, wherein the cabinet and the splice tray assembly define a passage between the rear wall of the cabinet and the splice tray assembly configured for passage of a plurality of optical fibers therethrough.

M. The splice enclosure of any one of example J through example L, wherein the splice tray housing is pivotally coupled to the cabinet.

N. The splice enclosure of any one of example J through example M, wherein the splice tray housing is pivotally coupled to the cabinet, such that the splice tray housing pivots about a housing pivot axis extending in a direction substantially perpendicular with respect to at least one of the first side wall or the second side wall.

O. The splice enclosure of any one of example J through example N, wherein at least one of the plurality of splice trays is pivotally coupled to the splice tray housing.

P. The splice enclosure of any one of example J through example O, wherein at least one of the plurality of splice trays is pivotally coupled to the splice tray housing, such that the at least one of the plurality of splice trays pivots about a splice tray pivot axis extending in a direction substantially perpendicular with respect to at least one of the first side wall or the second side wall.

Q. An example assembly comprising:
  a plurality of cables comprising a plurality of optical fibers; and
  a splice enclosure providing a space receiving a plurality of spliced optical fibers of the plurality of cables, the splice enclosure comprising:
    a cabinet defining an interior volume and comprising:
      a rear wall;
      a first side wall coupled to the rear wall;
      a second side wall coupled to the rear wall and spaced from the first side wall;
      a lower wall coupled to at least one of the first side wall, the second side wall, or the rear wall;
      a front panel coupled to the first side wall; and
      an upper wall removably coupled to at least one of the first side wall, the second side wall, or the rear wall, the upper wall providing at least one entry point for the plurality of cables; and
    a splice tray assembly comprising:
      a splice tray housing coupled to the cabinet; and
      a plurality of splice trays coupled to the splice tray housing and configured to provide a space for receipt of a plurality of spliced optical fibers of a plurality of cables,
    wherein the cabinet and the splice tray assembly define a passage between the rear wall of the cabinet and the splice tray assembly, and
    wherein the plurality of optical fibers passes through the upper wall, downward along the rear wall through the passage defined by the splice tray assembly and the rear wall, and loop back upward and into at least one of the splice trays.

R. The assembly of example Q, wherein the splice enclosure further comprises:
  a bracket coupled to the cabinet in the interior volume at an end of the cabinet remote from the lower wall, the bracket including an aperture; and
  a clip coupled to at least one of the plurality of cables and comprising a boss received in the aperture of the bracket coupling the clip and the at least one cable to the bracket.

S. The assembly of example Q or example R, wherein the splice tray assembly is pivotally coupled to the cabinet, such that the splice tray assembly pivots about an assembly pivot axis extending in a direction substantially perpendicular to at least one of the first side wall or the second side wall.

T. The assembly of any one of example Q through example S, wherein at least one of the splice trays is pivotally coupled to the splice tray assembly, such that the at least one splice tray pivots about a tray pivot axis extending in a direction substantially perpendicular to at least one of the first side wall or the second side wall.

What is claimed is:

1. A splice enclosure for providing a space for receipt of a plurality of spliced optical fibers of a plurality of cables, the splice enclosure comprising:
 a cabinet defining an interior volume and comprising:
  a rear wall;
  a first side wall coupled to the rear wall;
  a second side wall coupled to the rear wall and spaced from the first side wall;
  a lower wall coupled to at least one of the first side wall, the second side wall, or the rear wall; and
  a front panel coupled to the first side wall,
  wherein the cabinet defines a longitudinal axis extending in a direction parallel to planes in which the rear wall and at least one of the first wall or the second wall lie; and
 a splice tray assembly comprising:
  a splice tray housing pivotally coupled to the cabinet; and
  a plurality of splice trays pivotally coupled to the splice tray housing and configured to provide a space for receipt of a plurality of spliced optical fibers of a plurality of cables,
  wherein the splice tray housing is pivotally coupled to the cabinet, such that the splice tray housing pivots about a housing pivot axis extending in a direction substantially perpendicular with respect to the longitudinal axis and substantially parallel with respect to the plane in which the rear wall lies, and
  wherein in the splice tray housing comprises a first end wall defining a first plane substantially parallel to the first side wall of the cabinet, and a second end wall defining a second plane substantially parallel to the first plane, and wherein the plurality of splice trays is coupled to the splice tray housing between the first wall and the second wall.

2. The slice enclosure of claim 1, further comprising a pivot stop coupled to the cabinet and the splice tray housing and configured to limit a pivot angle through which the splice tray housing pivots relative to the cabinet.

3. The splice enclosure of claim 1, wherein the splice tray housing is releasably coupled to the cabinet for separation of the splice tray housing and splice trays from the cabinet.

4. The splice enclosure of claim 1, wherein at least one of the plurality of splice trays is pivotally coupled to the splice tray housing, such that the at least one of the plurality of splice trays pivots about a splice tray pivot axis extending in a direction substantially perpendicular with respect to the longitudinal axis of the cabinet and substantially parallel with respect to the plane in which the rear wall lies.

5. The splice enclosure of claim 1, wherein at least one of the plurality of splice trays is coupled to the splice tray housing, such that the at least one of the plurality of splice trays is independently pivotable relative to the splice tray housing.

6. The splice enclosure of claim 1, wherein the cabinet further comprises an upper wall removably coupled to at least one of the first side wall, the second side wall, or the rear wall, the upper wall configured to provide at least one entry point for a plurality of cables.

7. The splice enclosure of claim 1, further comprising a bracket coupled to the cabinet at an end of the cabinet remote from the lower wall, the bracket including an aperture configured to receive a boss associated with a clip configured to be coupled to at least one cable and the bracket.

8. The splice enclosure of claim 1, wherein the cabinet and the splice tray assembly define a passage between the rear wall of the cabinet and the splice tray assembly configured for passage of a plurality of optical fibers therethrough.

9. A splice enclosure for providing a space for receipt of a plurality of spliced optical fibers of a plurality of cables, the splice enclosure comprising:
 a cabinet defining an interior volume and comprising:
  a rear wall;
  a first side wall coupled to the rear wall;
  a second side wall coupled to the rear wall and spaced from the first side wall;
  a lower wall coupled to at least one of the first side wall, the second side wall, or the rear wall; and
  a front panel coupled to the first side wall,
  wherein the cabinet defines a longitudinal axis extending in a direction parallel to planes in which the rear wall and at least one of the first wall or the second wall lie; and
 a splice tray assembly comprising:
  a splice tray housing pivotally coupled to the cabinet; and
  a plurality of splice trays pivotally coupled to the splice tray housing and configured to provide a space for receipt of a plurality of spliced optical fibers of a plurality of cables,
  wherein the splice tray housing is pivotally coupled to the cabinet, such that the splice tray housing pivots about a housing pivot axis extending in a direction substantially perpendicular with respect to the longitudinal axis and substantially parallel with respect to the plane in which the rear wall lies, and
  wherein the cabinet further comprises an upper wall removably coupled to at least one of the first side wall, the second side wall, or the rear wall, the upper wall configured to provide at least one entry point for a plurality of cables.

10. The splice enclosure of claim 9, wherein in the splice tray housing comprises a first end wall defining a first plane substantially parallel to the first side wall of the cabinet, and a second end wall defining a second plane substantially parallel to the first plane, and wherein the plurality of splice trays is coupled to the splice tray housing between the first wall and the second wall.

11. The slice enclosure of claim 9, further comprising a pivot stop coupled to the cabinet and the splice tray housing and configured to limit a pivot angle through which the splice tray housing pivots relative to the cabinet.

12. The splice enclosure of claim 9, wherein the splice tray housing is releasably coupled to the cabinet for separation of the splice tray housing and splice trays from the cabinet.

13. The splice enclosure of claim 9, wherein at least one of the plurality of splice trays is pivotally coupled to the splice tray housing, such that the at least one of the plurality of splice trays pivots about a splice tray pivot axis extending in a direction substantially perpendicular with respect to the longitudinal axis of the cabinet and substantially parallel with respect to the plane in which the rear wall lies.

14. The splice enclosure of claim 9, wherein at least one of the plurality of splice trays is coupled to the splice tray housing, such that the at least one of the plurality of splice trays is independently pivotable relative to the splice tray housing.

15. The splice enclosure of claim 9, further comprising a bracket coupled to the cabinet at an end of the cabinet remote from the lower wall, the bracket including an aperture configured to receive a boss associated with a clip configured to be coupled to at least one cable and the bracket.

16. The splice enclosure of claim 9, wherein the cabinet and the splice tray assembly define a passage between the rear wall of the cabinet and the splice tray assembly configured for passage of a plurality of optical fibers therethrough.

\* \* \* \* \*

UNITED STATES PATENT AND TRADEMARK OFFICE
CERTIFICATE OF CORRECTION

PATENT NO. : 10,895,695 B2  
APPLICATION NO. : 16/844202  
DATED : January 19, 2021  
INVENTOR(S) : Richard David Morris et al.

Page 1 of 1

It is certified that error appears in the above-identified patent and that said Letters Patent is hereby corrected as shown below:

On the Title Page

On Page 2, in Column 2, item (56), Other Publications, Line 2, delete "Authroity;" and insert -- Authority; --, therefor.

In the Claims

In Column 13, Line 38, Claim 2, delete "slice" and insert -- splice --, therefor.

In Column 14, Line 46, Claim 11, delete "slice" and insert -- splice --, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*